April 7, 1959 T. R. L. LAZARR 2,880,463
MOLDING APPARATUS FOR MAKING WORK-HOLDING FIXTURES
Filed June 16, 1953
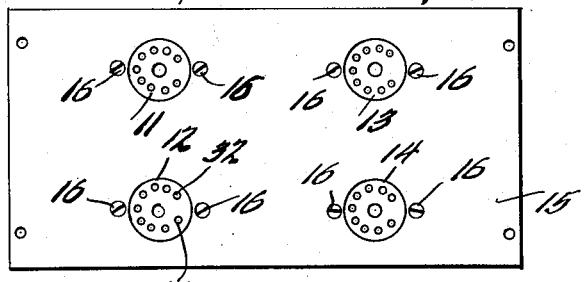
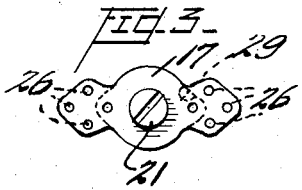
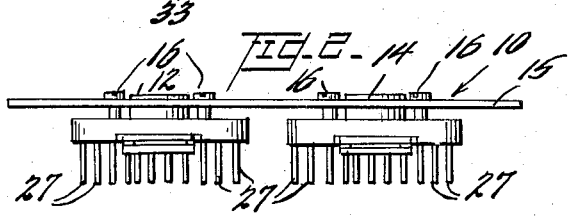
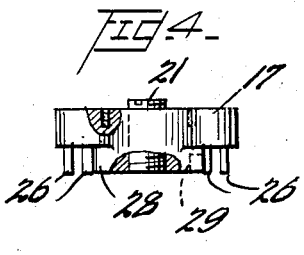
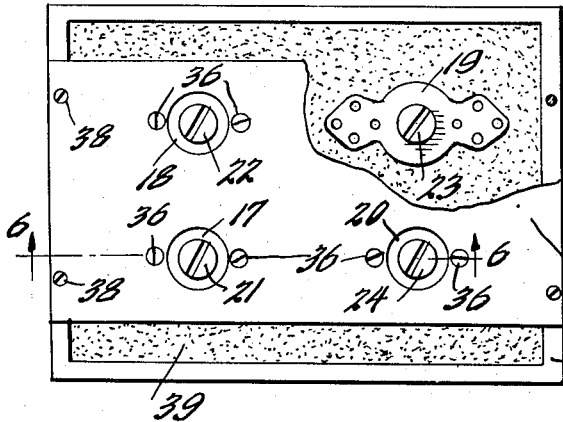
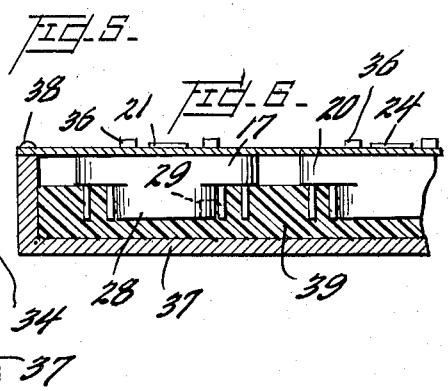
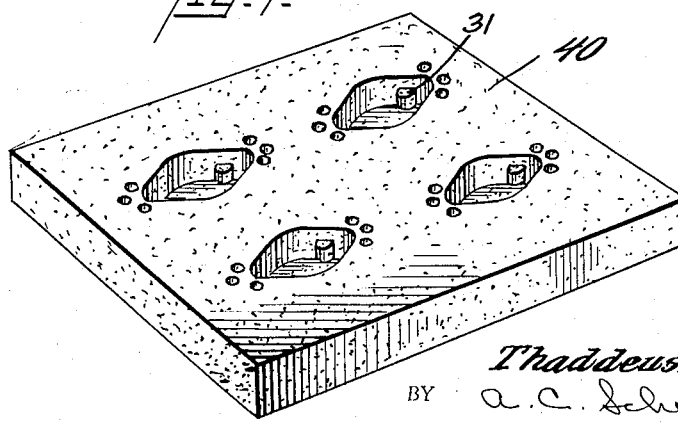
INVENTOR
Thaddeus R. L. Lazarr,
BY A. C. Schwarz Jr.
ATTORNEY United States Patent Office 2,880,463
Patented Apr. 7, 1959

2,880,463

MOLDING APPARATUS FOR MAKING WORK-HOLDING FIXTURES

Thaddeus R. L. Lazarr, Greensboro, N.C., assignor to Western Electric Company, Incorporated, New York, N.Y., a corporation of New York Application June 16, 1953, Serial No. 362,045

1 Claim. (Cl. 18—39)

This invention pertains to apparatus for producing work-holding fixtures, and in particular to apparatus for producing fixtures for holding component parts in proper position for quick assembly thereof.

In the production of work-holding fixtures, the conventional machining and tooling method has often been found undesirable because of material shortages, high cost, and lengthy production time.

It is an object of this invention to provide a simple, efficient, economical, and convenient apparatus for producing a work-holding fixture that can be used for tube socket and chassis assembly, for holding work during a drilling operation, or for holding work during many other assembly and machining operations.

A complete understanding of the invention may be obtained from the following detail description taken in conjunction with the accompanying drawings, in which Fig. 1 is a plan view of a complete assembly of tube sockets mounted on a chassis;

Fig. 2 is a side view of the assembly shown in Fig. 1;

Fig. 3 is a plan view of a pattern corresponding to the tube sockets shown in Figs. 1 and 2;

Fig. 4 is a side view of the pattern shown in Fig. 3 having a partial section to show a threaded member therein;

Fig. 5 is a plan view of a plurality of patterns mounted on a chassis having a portion thereof cut away and positioned in a mold containing a plastic material;

Fig. 6 is a partial vertical section taken along line 6—6 of Fig. 5; and

Fig. 7 is a perspective view of a finished work-holding fixture.

Referring now to the drawings, attention is directed to Figs. 1 and 2, wherein a complete assembly 10 is shown in plan view and side view, respectively. The complete assembly 10 comprises four identical tube sockets 11, 12, 13, and 14 mounted on a chassis 15 and secured thereto by eight identical threaded members 16. This particular assembly 10 is shown to illustrate a typical unit to be assembled although many variations in the number, type and location of components can be used. Each component has a predetermined location with respect to other components depending upon space limitation, wiring problems, and circuit design. Only four tube sockets 11, 12, 13, and 14 are shown to illustrate a possible configuration, although other components such as resistors and condensers may be used. In order to hold the tube sockets 11, 12, 13, and 14 in proper position while they are being secured to the chassis 15 by the threaded members 16, a work-holding fixture 40, as illustrated in Fig. 7, is utilized for rapid assembly. This permits an operator to use both hands to apply washers, screws, and other parts, and also permits the use of a ratchet, pneumatic or electric screw driver for speedy assembly operation.

In accordance with the apparatus contemplated by the present invention for producing the work-holding fixture 40, four identical steel patterns 17, 18, 19, and 20 having threaded members 21, 22, 23, and 24 centrally passing therethrough as shown in Figs. 3, 4, 5, and 6 are fabricated. It is important to understand that in this application the term pattern is used to denote a member that forms a caviy in a work-holding means and can be an assembly-component or a reproduction thereof, since there are many component parts that can be used directly as a pattern, thus making it unnecessary to reconstruct a model thereof. The patterns 17, 18, 19, and 20 were chosen for illustration because they are reproductions of the tube sockets 11, 12, 13, and 14 which are standard components and are used in many assemblies.

In Figs. 3 and 4, the single pattern 17 is illustrated in plan and side views. End pins 26 of the pattern 17 correspond to end pins 27 of the tube socket 12, and a solid central portion 28 of the pattern 17 conforms to the outline of central pins on the tube socket 12. An indentation 29 in the solid central portions 28 of the pattern 17 will cause a projection 31 in the work-holding fixture 40 of Fig. 7 so that the tube socket 12 can be placed in the fixture 40 in only one position due to the irregular spacing between pins 32 and 33 of the tube socket 12 as compared to the even spacing of other of the pins.

A complete understanding of the preparation required to produce the finished work-holding fixture 40 of Fig. 7 may be obtained by referring now to Figs. 5 and 6. The patterns 17, 18, 19 and 20 are cleaned, de-greased, and then secured in proper position to an assembly chassis 34, Fig. 5, that is identical to the chassis 15 of Fig. 1, by means of threaded members 36. Each pattern is given several coats of baked enamel or japaning lacquer and then waxed so that the cavities produced by the patterns 17, 18, 19, and 20 in the finished fixture 40 will be large enough to allow easy and speedy insertion of the tube sockets 11, 12, 13, and 14 without excessive clearance. Experience indicates that cavities .020" oversize serve this purpose best. The chassis 34 with the patterns 17, 18, 19, and 20 attached thereto is then placed on a mold 37 and secured thereto by suitable fastening members 38. The mold 37 is a wooden box that has been internally covered with several coats of paint and then waxed, but obviously can be any suitable receptacle.

A plastic material 39 is then poured into the mold 37 to a proper height as shown in Fig. 6. The plastic material 39 is a non-shrink casting resin such as thermosetting liquid phenolic plastic. Then the mold 37, together with the chassis 34, patterns 17, 18, 19, and 20, and the plastic material 39 is placed in an oven at a constant, controlled temperature until the plastic material 39 is set.

After the plastic material 39 has hardened, the mold 37 is removed from the oven and permitted to cool. Then the threaded members 36 and fastening members 38 are withdrawn and the chassis 34 is removed. The patterns 17, 18, 19, and 20 are then forced from the hardened plastic material 39 by twisting the centrally located threaded members 21, 22, 23, and 24 of each pattern. Thereafter the plastic material 39 is removed from the mold 37 and becomes the finished work-holding assembly fixture 40 as shown in Fig. 7.

In an assembly operation, the fixture 40, Fig. 7, is placed on a bench, the tube sockets 11, 12, 13, and 14, Fig. 1, are easily inserted in the fixture cavities, and the chassis 15 is quickly placed over the tube sockets 11, 12, 13, and 14 and rested thereon. Then the operator can use both hands to apply the threaded members 16, in order to secure the tube sockets 11, 12, 13 and 14 to the chassis 15, after which the completed assembly 10, as shown in Fig. 1, is removed from the work-holding fixture 40. This assembly operation is thereafter repeated with other tube sockets and chassis.

Although the invention has been described with reference to a particular embodiment, it is to be understood that various modifications may be made without departing from the scope and spirit of the invention.

What is claimed is:

Molding apparatus for making a work-holding fixture comprising a chassis, a plurality of patterns attached removably to the chassis in predetermined spacial relationship corresponding to work-holding positions desired to be formed in the fixture, each pattern having a threaded aperture centrally passing therethrough, threaded members threadedly engaged within the apertures, and a walled open-topped mold for retention therein of a plastic mold material capable of setting into a hardened state, the chassis being removably engaged with the open-topped mold such that the patterns extend into the mold to a depth sufficient to be encompassed by a mold material introduced into the mold, the threaded members of said patterns being rotatably adjustable in a vertical direction through the patterns whereby the patterns may be separated from a hardened molded material encompassing the patterns by rotation of the threaded members against the hardened mold material.

References Cited in the file of this patent

UNITED STATES PATENTS

| | | |
|---|---|---|
| 537,470 | Mann | Apr. 16, 1895 |
| 1,748,250 | Spang | Feb. 25, 1930 |
| 2,039,105 | Neary | Apr. 28, 1936 |
| 2,392,804 | Basolo | Jan. 15, 1946 |
| 2,463,965 | Grassi et al. | Mar. 8, 1949 |
| 2,516,091 | Renaud | July 18, 1950 |
| 2,705,344 | Salomone et al. | Apr. 5, 1955 |

OTHER REFERENCES

American Machinist, July 9, 1942, pp. 731–738, "Jigs and Dies from Cast Plastics."